Sept. 8, 1936.  P. A. KINZIE ET AL  2,053,668
HYDRAULIC ROTOR OPERATED BUTTERFLY VALVE
Filed March 10, 1933   7 Sheets-Sheet 2

Fig. 2

INVENTORS:
Phillip A. Kinzie,
John L. Savage,
Laurel E. France,
BY Byrnes, Townsend & Potter,
ATTORNEYS.

Sept. 8, 1936.  P. A. KINZIE ET AL  2,053,668
HYDRAULIC ROTOR OPERATED BUTTERFLY VALVE
Filed March 10, 1933  7 Sheets-Sheet 4

Fig. 10

Patented Sept. 8, 1936

2,053,668

UNITED STATES PATENT OFFICE 2,053,668

HYDRAULIC ROTOR OPERATED BUTTERFLY VALVE

Phillip A. Kinzie, John L. Savage, and Laurel E. France, Denver, Colo., assignors to Universal Hydraulic Corporation, Denver, Colo., a corporation of Colorado Application March 10, 1933, Serial No. 660,284

19 Claims. (Cl. 251—11)

This invention relates to valves and more particularly to those types of valves wherein opening or closure is effected by a rotary movement of the valve element in the manner as usually employed in butterfly valves and in damper, disk or leaf valves such as those used to control the flow of fluid within or through conduits or orifices whose shapes are circular, square or rectangular when taken in section normal to the line of fluid flow.

Such butterfly valves in the larger sizes may, for example, be used to shut off the flow of water in a penstock leading to a turbine, as an emergency gate to stop the flow of water in a conduit leading to a needle valve, as a combined flow control and stop valve in a city water main, or to control the discharge of water from a conduit into the atmosphere at a point below the valve. While these specific applications are noted as being illustrative of some of the uses to which a valve such as is contemplated by this invention may be applied, it is to be understood that it may readily be used for many other purposes with equal advantage and economy.

Valves of the character as contemplated by this invention are particularly susceptible to use under exceptionally severe operating conditions where heavy pressures are prevalent and relatively large quantities of fluid are to be controlled at high velocities of flow therethrough, in short to that field of service where conventional types of butterfly or pivot valves or other similar equipment are either inadequate or unsatisfactory, or both.

As is known to those skilled in the art, valves of the butterfly type when being operated under emergency conditions, when the flow therethrough approaches free discharge velocities, require operating mechanisms capable of producing large turning efforts upon the valve stems, and the required turning capacities of such mechanisms increase very rapidly as the fluid velocity is increased. Back-geared turning mechanisms such as those illustrated in our copending application on butterfly valves, Serial No. 551,524, filed July 17, 1931, now Patent No. 1,951,283 issued Mar. 13, 1934, have proven satisfactory for moderate heads or pressures, as has also been the case with the conventional type hydraulic cylinder mechanisms used in actuating bell cranks or racks meshing with gear segments attached to the valve stems. With increases in both sizes of such valves and their working pressures as well, as are now demanded by modern engineering practice, such types of operating gears become exceedingly cumbersome and bulky when designed to meet these new conditions with their greatly increased turning torque requirements and they likewise are inherently of such nature as to create and introduce augmented bending stresses into the valve stems which usually are already under high stress. Such mechanisms likewise tend to pull the valves out of alignment with their conduits on either side and they also require elaborate, independent and costly anchorages and foundations which still further encroach upon the available operating floor space of the buildings within which they are installed.

As an example of this condition, the valve illustrated in this application is 14'—0" diameter, designed for 690 feet maximum working head, and is provided with an operating mechanism capable of safely closing the valve with a maximum flow of 8,000 cubic feet per second passing therethrough. A similar valve designed for these same conditions and provided with the conventional type of motor-driven, high-pressure oil pump with its hydraulic operating cylinder, piston, connecting rod and stem crank, all in accordance with a design prepared by one of the world's leading turbine and valve manufacturers, is more than thirty-three feet in length from the center line of valve stem to the end of the cylinder casing, and the hub diameter of the lever where it goes over the stem is nearly equal to the outside diameter of the hydraulic rotor mechanism shown in this application, and, when this equipment is positioned in accordance with the recommendations of this manufacturer's specifications and so arranged as to impose the least amount of added bending moment upon the valve stem, has its greatest length extending at practically right angles to the path of flow through the valve. This mechanism in consequence pulls with its full power in the same general direction (at right angles to the line of flow through the penstock and valve) and so tends to force the valve out of the penstock line, and also to rotate it with respect to the penstock as well.

The operating mechanism just described is designed to produce a turning effort on the butterfly valve shaft of more than 25,000,000 inch-pounds. It is difficult to properly visualize forces of magnitudes such as these, but some measure of their scope may be obtained when the maximum duty of such a valve is considered and the energy within the stream which it controls is computed. With such a valve under 300 pounds per square inch working pressure, and with a flow of 8,000 cubic feet a second, a velocity of 78 feet per second through the valve occurs. The energy contained within this water amounts to more than 629,000 horsepower. This is roughly the equivalent of the combined power output of three of the largest size aircraft carriers such as the *Lexington* or *Ticonderoga*.

With yardsticks such as the above to measure with, it might seem that a turning mechanism a little over 33 feet long, as mentioned earlier in this application, would not be of unreasonable size in view of the task it has to perform. Yet, in the valve of our invention the turning mechanism which we provide is but 6'—5" in diameter and it is centralized with respect to the valve's axis and it is made an integral part of the main valve structure. In consequence of these facts, it therefore imposes no additional bending moment upon the valve stem nor does it seek to tear the valve out of the conduit in which it is installed, nor does it tend to rotate the valve body about the axial line of flow through the valve and penstock.

To more clearly depict the possibilities of our invention, the following data are included in this application. The 168" diameter valve illustrated in the accompanying drawings is designed for 300 pounds per square inch working pressure and will be required to close when 8,000 cubic feet per second are passing therethrough at a velocity of 78 feet per second; i. e., to interrupt a flow of water which represents a total theoretical energy of more than 629,000 horsepower. When confronted with forces whose order of magnitude are such as these, and when they are concentrated within such relatively small boundaries, their potential destructive capacities are difficult to visualize and the design data derived from previous experience falls short of the present needs and affords but a partial and unsatisfactory solution for equipment which is adequate to meet, control and guard forces of this greatly extended range.

The water load upon the gate leaf of the above valve, when closed, is over 6,650,000 pounds, which is equivalent to more than the combined weight of nine large freight locomotives of the Central Vermont 2—10—4 type, which with tenders fully loaded weigh 688,600 pounds each. With such a load present, it is obvious that regardless of how strong the component parts might be, some deformation necessarily must occur, and so this load causes the leaf to bow and it deflects the stems above and below the leaf, where they are supported in their bearings in the valve body. This causes the extension of the upper stem above its bearing to lean upstream on an angle of approximately 4 minutes with respect to the true vertical axis of the valve, and, as the valve leaf swings from the closed position towards the open position the variation of loading from the static water load to the dynamic load of the swiftly flowing stream impinging upon the leaf causes this angularity of the stem's deflection to vary. This condition presented a very perplexing and disconcerting problem in the design, construction and mounting of the cooperating torque generating parts associated with this stem extension, as mechanism sufficiently powerful as to be capable of imparting the requisite torque into the stem extension dictated a structure which was so rugged as to effectually restrain the stem from deflection above its bearing, and it was found that when the stem was so restrained, a negative bending stress of dangerous intensity was produced by such restraint, and further investigation revealed that if the required freedom of deflectional movement were given this stem extension by providing clearance between it and the adjacent parts, the clearance required would be so large as to render the hydraulic rotor inoperative by reason of leakage through the clearances so provided. Consideration was given to providing a flexible coupling in the stem immediately above its bearing, but the physical dimensions of such a coupling capable of transmitting the heavy torque required made it prohibitive. How this as well as many other critical problems of construction and cooperative functioning have been met and overcome by our invention will become apparent as the description proceeds.

According to the present invention, the field of usefulness of this type of valve may be extended to the control of large quantities of water under high pressure such as the major trunk mains in the larger municipal water systems, in penstocks for generation of power, and, in general, to installations in which it would be impracticable, or uneconomical from an ultimate installed cost standpoint, to apply those of the conventional designs. This invention in part is not limited, however, to those fields of use in which conventional butterfly valves are impracticable or uneconomical, since the torque-producing mechanism herein employed may be applied to many other uses where extreme compactness combined with great power are essential requisites, and we so contemplate its use under such conditions for operation of automatic metal and woodworking machinery, manufacturing processes, etc.

An object of the invention is to provide a butterfly valve of improved design with an operating mechanism which is compact and powerful and which becomes an integral part of the valve structure which in its entirety is self-contained and comprises a complete operating and functioning unit economical to build, easy to install and requiring the least expenditure for the housing structure within which it is placed for controlling the flow of fluids under heavy pressures. An object of the invention is to provide a butterfly valve with an operating mechanism which imparts the turning effort into the valve stem without any accompanying bending stresses in the stem, and to so apply the torque from the operating mechanism that it is balanced with respect to the stem's axis of rotation so that the added bending moment prevalent with other types of operating mechanism is eliminated. An object of the invention is to provide a valve of the butterfly type of such design and construction as to make unnecessary the massive and expensive anchorages required by other valves to resist the reactions imposed upon them by their independently mounted operating gears. An object of the invention is to provide a valve of the butterfly type with an operating mechanism embodying a positive, automatic, hydraulically-operated locking device which will hold the valve leaf from further movement in either direction in any position to which it has been moved through the agency of the operating mechanism, which upon coming to rest, immediately brings the locking device into action simultaneously, regardless as to whether the valve be open, or closed, or in any intermediate position between these limits of its travel. An object of the invention is to provide a valve of the butterfly type with a compact and powerful operating mechanism wherein no moving parts are exposed to endanger persons or adjacent equipment, and which is so arranged and constructed that all its motivating and controlling mechanisms are made integral with it, so that no motor bases with interconnecting conduits and wiring, and no supplemental oil tanks with interconnecting supply and return piping are required. An object of the invention is to provide a valve of the butterfly type with an operating mechanism so arranged and constructed as to contain within itself the oil reservoirs supplying the prime mover actuating it, and also to receive the return flow therefrom. An object of the invention is to provide a valve of the butterfly type with an operating mechanism centralized with respect to the axis of the valve's stem, and which automatically aligns itself with this stem axis as it deviates from the theoretically correct position in response to the valve's rotative movements when under load and under service conditions, and which applies the power for turning the valve in perfect balance to the stem while allowing it complete freedom to accommodate itself to the varying deflections imposed upon it by the changing dynamic and static water loadings of the valve leaf as they occur responsive to the valve's rotation. An object of the invention is to provide a valve of the rotational type with an anti-friction bearing centralized with respect to the axis of rotation which receives and carries the weight of all the revolving parts, and which is so arranged that by use of the prime movers power whereby rotation is imparted to these parts, they may be lifted, centralized and correctly positioned with respect to the axis of the conduit and the line of fluid flow, and then when so centralized be permanently locked to maintain this adjustment.

A further object of the invention is to provide a valve of the butterfly type wherein the operating mechanism is of simple and rugged construction with all its working parts easily accessible, yet thoroughly protected from injury either by direct contact or by intrusion of dirt or grit, and which are all thoroughly and automatically lubricated by the fluid (oil) employed under high pressure in the prime mover. A further object of the invention is to provide a valve of the butterfly type which is fully protected against overtravel in either opening or closing directions and against excessive operating fluid pressures within the operating mechanism. A further object of the invention is to provide a valve of the butterfly type with metallic adjustable seals in the disk or leaf which can be adjusted from the dry side of the leaf while under pressure and then positively locked to maintain this adjustment. A further object of the invention is to provide a valve of the butterfly type wherein the disk or leaf will be brought to rest at precisely the same position each time it is either opened or closed by means of positively adjustable stops within the hydraulic rotor, thereby assuring that whenever the valve is closed after the final adjustments have been made upon the metallic seals around the periphery of the disk or leaf, the same precise position will be repeated each time, thereby maintaining the seal adjustment in the most effective manner. A further object of the invention is to provide a valve of the butterfly type in which the arrangement and construction of the valve body and valve leaf are such as to afford employment in the most effective manner to arc welding of the component plates and shapes to form the complete units in both instances and so permit large savings in metal over their cast prototypes by reason of more effective use of the material and by the facility afforded for the employment of a higher grade of material than that available in castings. A further object of the invention is to provide a valve of the butterfly type wherein the heavy turning effort produced by the operating mechanism, instead of being transmitted into the valve stem by means of twin keys, is evenly distributed around the entire circumference of the stem by uniformly spaced splines, thereby conserving the symmetry and strength of the stems. A further object of the invention is to provide a valve of the butterfly type which is rugged in construction, of but relatively few parts, positive and sure in operation, so designed that every part cooperates effectively with every other part and whose parts so blend in with the whole structure as to form a harmonious entity attractive in appearance, efficient in service, and affording true economy in fabrication, installation and use.

More specifically, an object of the invention is to provide a valve of the butterfly type which is adapted to control the flow of large quantities of water under high pressures and velocities, positively, safely and economically, and which may be actuated either by an electrically-driven direct mounted pump as illustrated in this application, or by high pressure fluid supplied to the operating mechanism from any suitable independent source of supply.

These and other objects and advantages of the invention will be apparent from the following specification when taken with the accompanying drawings, in which:—

In the drawings which illustrate the invention as embodied in valves for use in conduits of circular cross section, the reference numeral 1 identifies the valve body or cylindrical casing in which the valve leaf 2 is pivotally supported and mounted by the upper stem 3 and the lower stem 4, whose opposingly facing stub ends are pressed into mating bores in the opposite hub ends of the leaf 2, and are also secured to the leaf by the shouldered screws 5, Figs. 2, 3, 4 and 5, which pass through the stem collars and into the leaf hubs, where they are threadably received, and by this construction transfer the turning effort of the operating mechanism from the upper stem into the leaf through these screws acting in shear.

Figure 2:
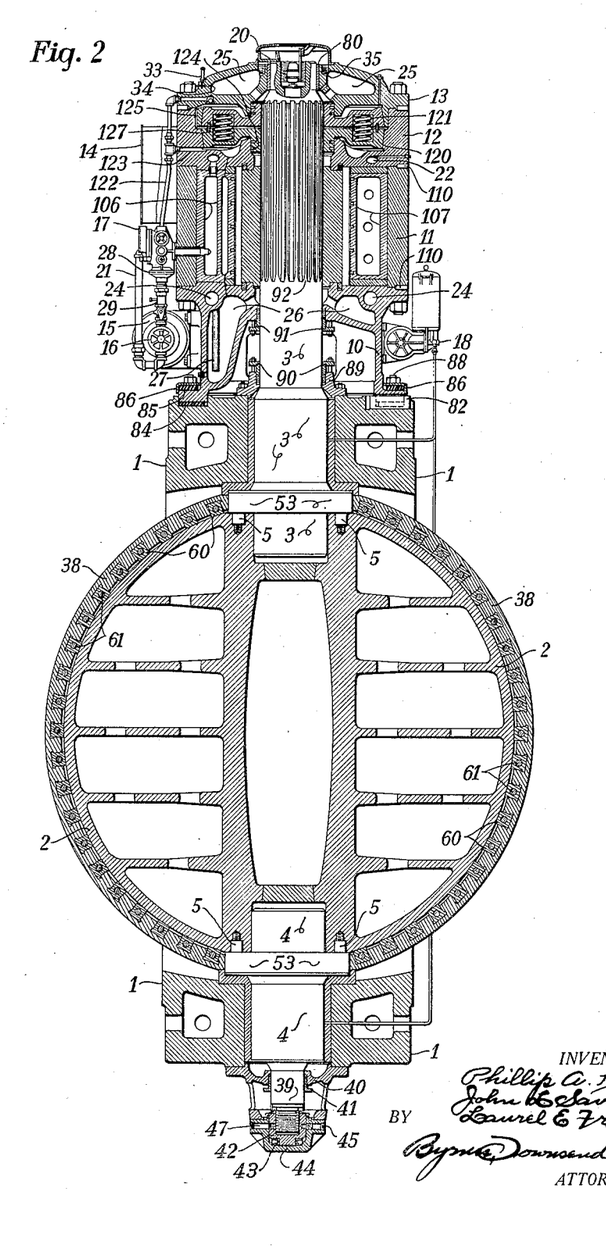
Fig. 2 is a vertical longitudinal section of the complete installation taken substantially upon the line 2—2 of Fig. 1.
Figures 3, 4, 5, 6, 7, 8:
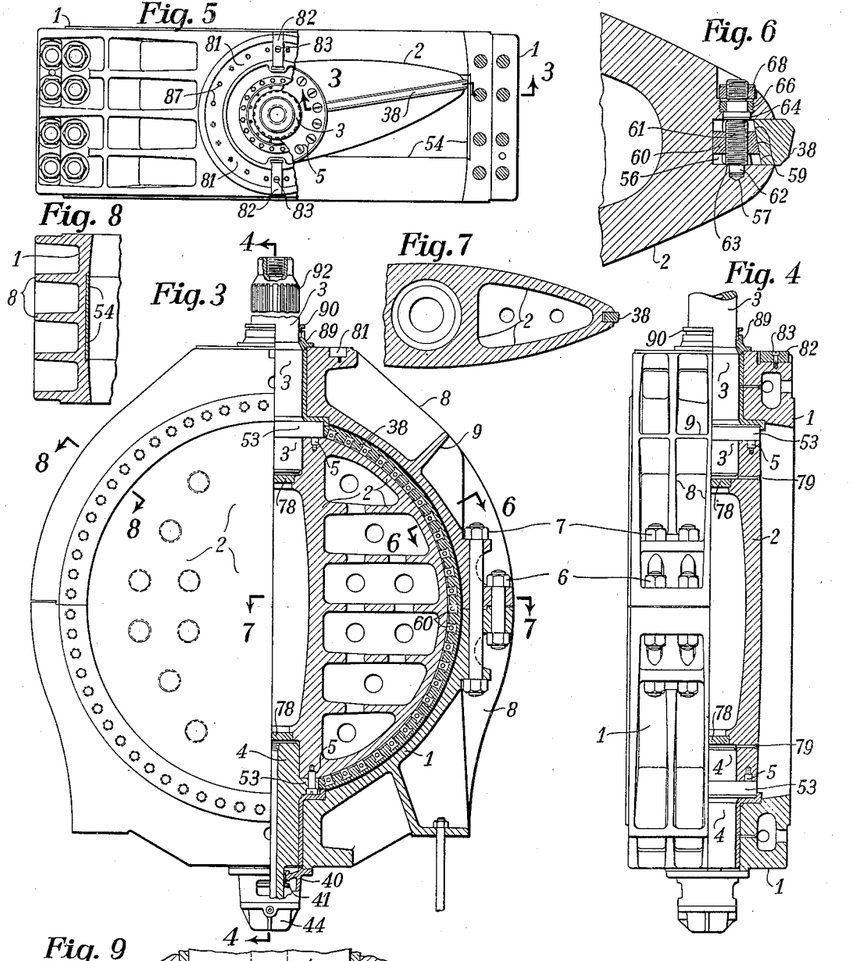
Fig. 3 is a half front elevation and a half vertical section taken upon line 3—3 of Fig. 5, showing the valve body with the leaf in the fully closed position.
Fig. 4 is a half side elevation and half vertical longitudinal section taken substantially upon the line 4—4 of Fig. 3.
Fig. 5 is a half plan view of Fig. 3, and a half view with the upper portion of the valve body removed.
Fig. 6 is an enlarged sectional view taken upon the line 6—6 of Fig. 3, showing the edge of the gate leaf or disk with its metallic seal and adjusting mechanism.
Fig. 7 is a horizontal section taken substantially upon the line 7—7 of Fig. 3, showing the gate leaf and seal only.
Fig. 8 is a section taken substantially upon the line 8—8 of Fig. 3, showing the valve body and its non-corrodible metal seat liner.

The casing 1 is composed of two mating castings comprising the upper and lower halves as may be seen in Figs. 2, 3 and 4, with their mating surfaces of jointure upon the horizontal center line of the valve and conduit where dual flanges are provided to receive the short bolts 6 and long bolts 7, Figs. 3 and 4, provide a double row of bolting to adequately fasten the halves of the valve body together to withstand the enormous loading imposed here by the high pressures which these valves are required to meet, and here an ingenious principle is employed to cause the short bolts 6 to carry an equal load with the long bolts 7, which is accomplished in the following manner: The long bolts 7 are made from a high grade alloy steel having a modulus of elasticity of about 30,000,000, while the short bolts 6 are made of a high grade high tensile bronze possessing a modulus of elasticity of about 14,000,000. By this arrangement the long bolts 7 stretch the same amount as the short bolts 6 and the loading on all the bolts in consequence is equalized. Inasmuch as the bolts on the valve illustrated are 6 inches in diameter, the importance of securing equal loading on all the bolts is self-evident.

Heavy vertical ribs 8 with transverse stiffener ribs 9 are provided around the exterior of the valve body 1, Figs. 3 and 4, which maintain the circular shape of the body and stiffen the dual flanges at the longitudinal joints where the heavy reactions are carried by bolts 6 and 7, likewise these ribs strengthen the upper and lower stem bearings where the transfer of load and thrust from the leaf through the upper and lower stem occurs.

Figure 1:
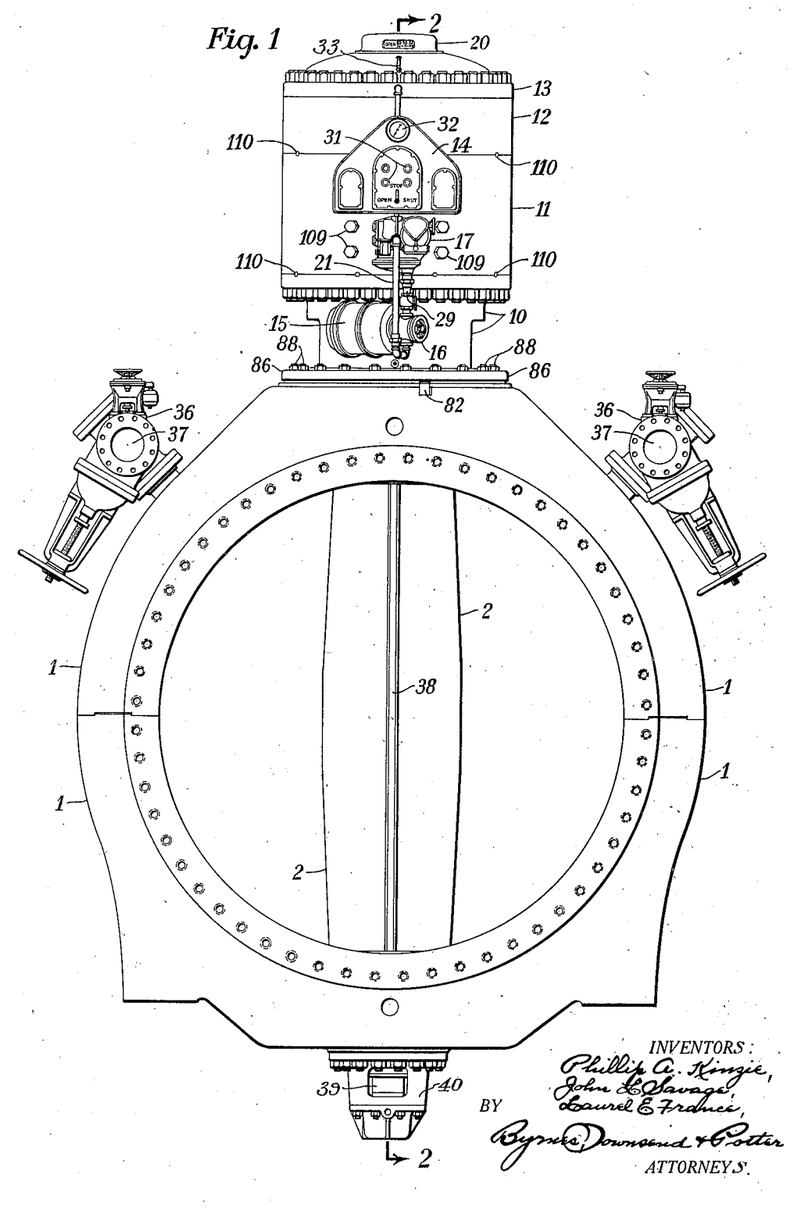
Fig. 1 is a front elevation of the complete valve and rotor installation, looking upstream along the axial line of the penstock, with the valve shown in fully opened position.
Figure 10:
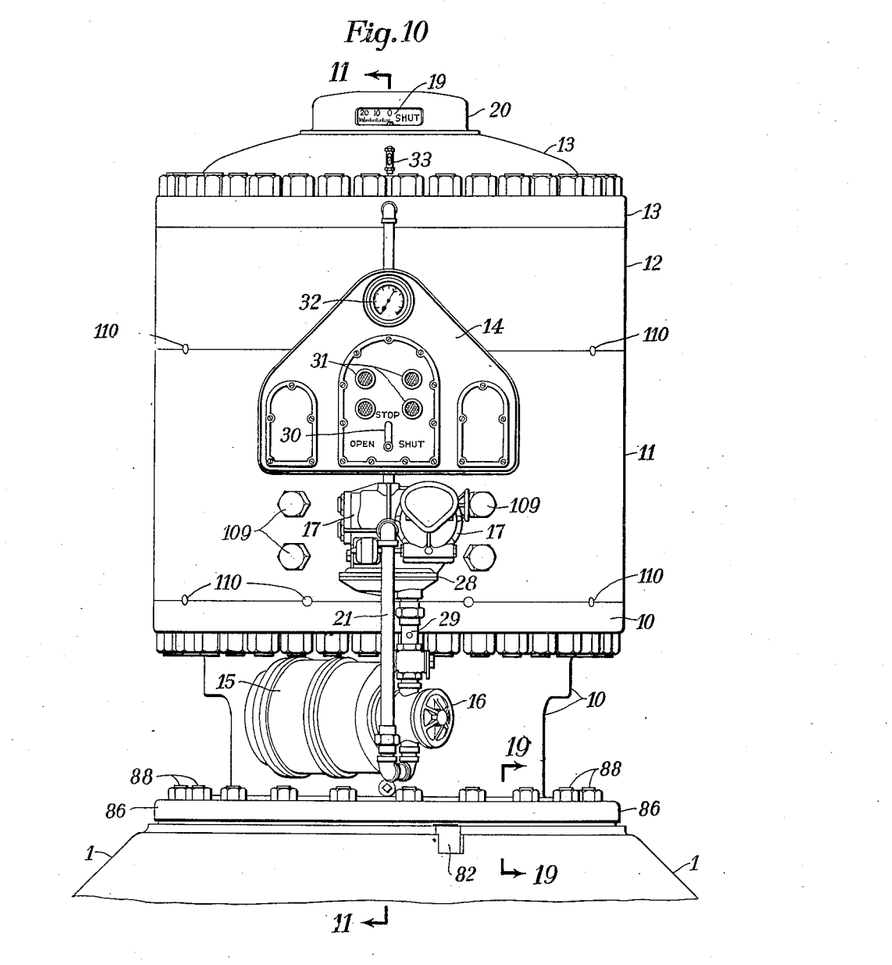
Fig. 10 is a front elevation of the complete hydraulic rotor mechanism, showing the position indicator, control panel, control valve, main motor and oil pump.

By inspection of Figs. 1, 2, and 10 it will be seen that the complete valve structure consists of the casing 1, leaf 2, stems 3 and 4, as already described, and that superimposed on the top of the valve casing flange is the hydraulic rotor-actuating unit consisting of the base 10, cylinder 11, brake cylinder 12 and cover 13, which enclose the torque-producing elements which, by their interrelationship and functioning, rotate the leaf 2 to its open or to its closed position as will be presently described.

Figure 11:
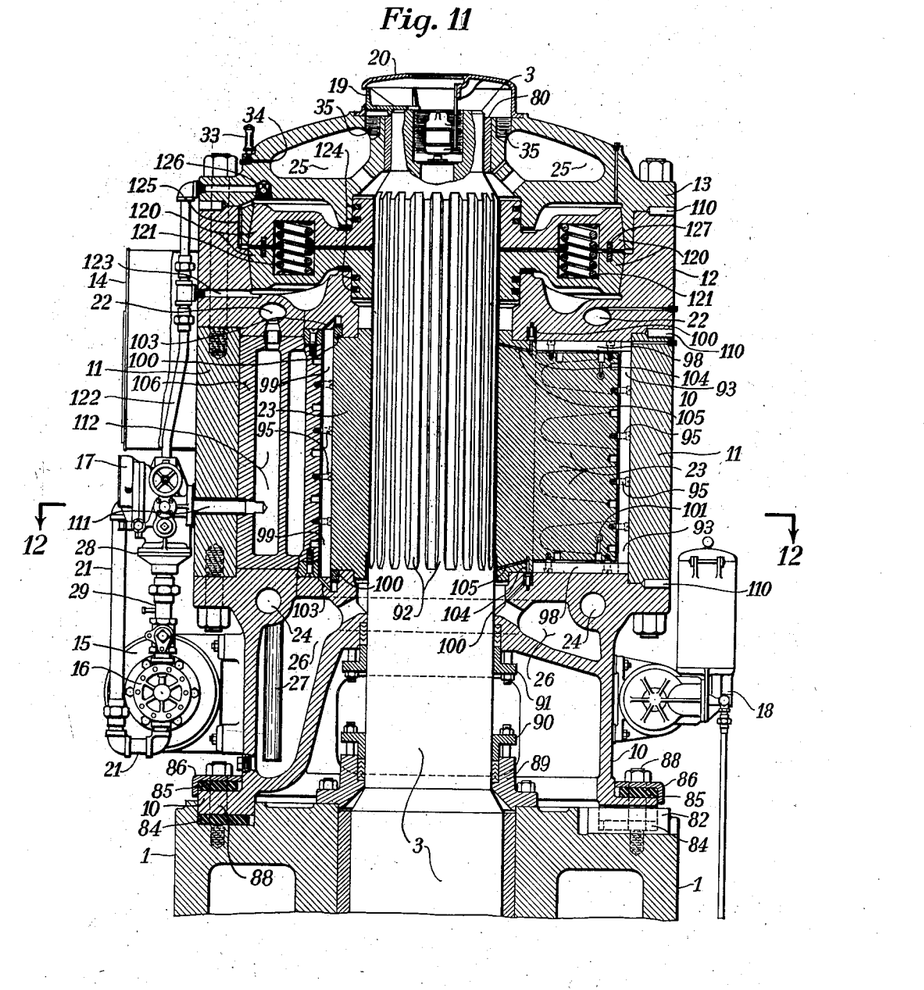
Fig. 11 is a vertical longitudinal section of the complete rotor assembly, taken substantially upon the line 11—11 of Fig. 10.

The auxiliary units consisting of the control panel 14, the main pump motor 15, the main oil pump 16, the rotor control valve 17 and the high-pressure grease pump 18, Figs. 2 and 11, are all mounted on the rotor unit in the manner shown, to make a compact and self-contained operating mechanism, while the position indicator dial 19, Fig. 10, is on top of the rotor unit and protected by the dial cover 20 mounted upon the cover 13 of the rotor unit.

Figures 12, 13, 14, 15, 16, 17, 18, 19:
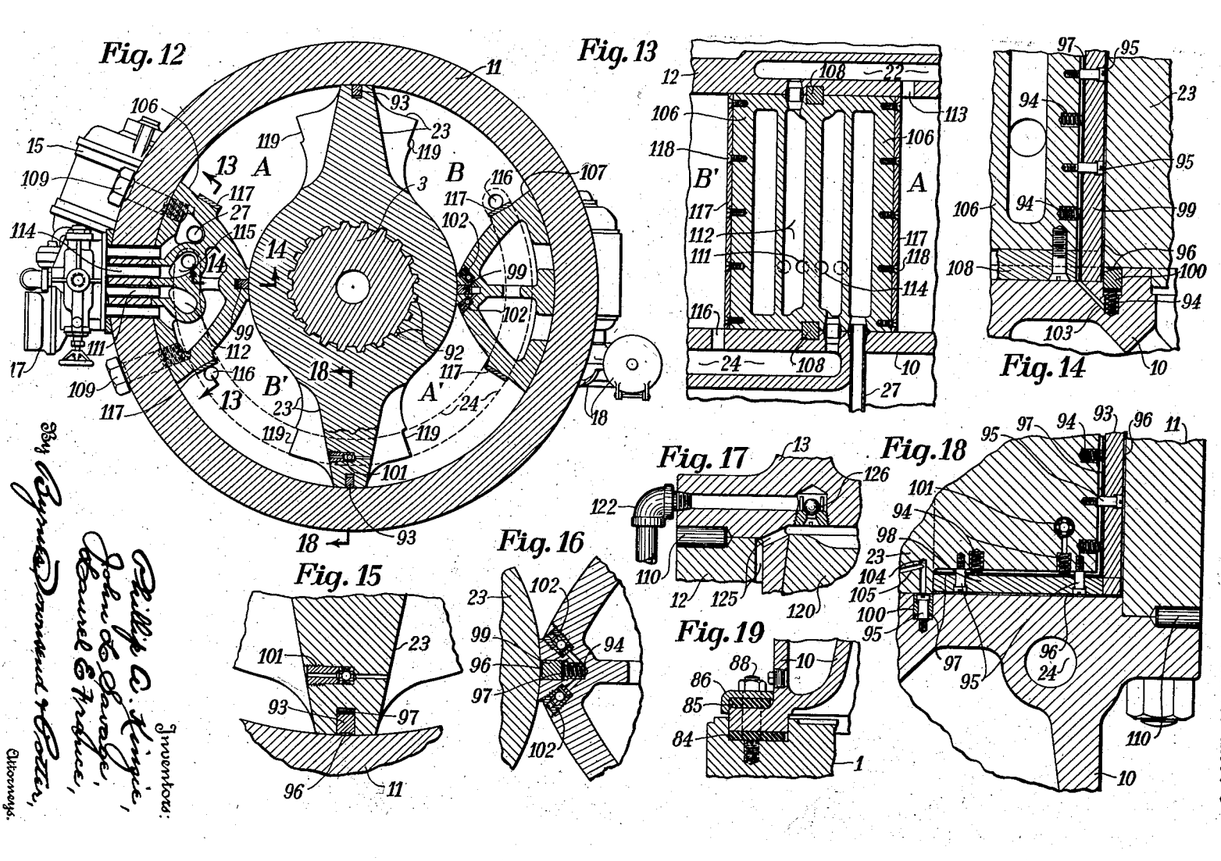
Fig. 12 is a horizontal section through the complete rotor assembly, taken substantially upon the line 12—12 of Fig. 11.
Fig. 13 is a vertical section through the manifold stator taken substantially upon the line 13—13 of Fig. 12.
Fig. 14 is an enlarged vertical section through the stator seals, taken substantially upon the line 14—14 of Fig. 12.
Fig. 15 is an enlarged fragmentary sectional view of the lower end of the rotor, taken at line 18—18 of Fig. 12.
Fig. 16 is an enlarged fragmentary horizontal view of the reservoir stator similar to that shown in Fig. 12, showing the details of the twin check valves, and the typical cross section of the stator seal and its mounting.
Fig. 17 is an enlarged vertical longitudinal section through the upper portion of the rotor mechanism adjacent to the oil level indicator of Fig. 11, showing the details of the ball check valve mechanism and its connections to and from the upper brake cylinder.
Fig. 18 is an enlarged vertical section taken substantially upon the line 18—18 of Fig. 12, showing the typical rotor seal installation.
Fig. 19 is a fragmentary detail of the rotor base flange in vertical section, taken substantially upon the line 19—19 of Fig. 10, and showing the cushioning rings with their metal guard.

The hydraulic rotor unit is caused to function by introducing oil under high pressure into diametrically opposed sealed pressure chambers A and A' or B and B' contained within the rotor cylinder 11, Fig. 12. The high speed rotary oil pump 16, Figs. 1 and 10, is driven by an electric motor 15 provided with a special end bell to which the mating end flange of the pump is bolted to form a single motor-pump unit. The discharge line 21 carries the high-pressure oil to the control valve 17 above, which, by means of a four-way valve arrangement, which will not be described or shown in detail in this present application, introduces the pressure oil into either the upper manifold passage 22, Figs. 2, 11, and 13, from which it is admitted into chambers A and A', Fig. 12, to cause clockwise or closing movement of the rotor 23, or by shifting the control valve 17, the pressure oil is admitted to the lower manifold passage 24, from which it is introduced to chambers B and B' and causes anti-clockwise rotation of the rotor 23 and of the valve leaf 2 to open the butterfly valve.

The rotary pump 16 is supplied with oil from the upper reservoir cavities 25, Figs. 2 and 11, which are in communication, by means which will be presently described, with the lower reservoir cavities 26 from which the suction pipe 27 draws oil upwardly to the control valve 17 through which it passes and then emerges downwards through the screen chamber 28 and after being cleaned by flowing through the screens therein continues through the pump suction line 29 and into the pump below.

In the embodiment of the invention illustrated, the maximum working fluid pressure employed is 1,000 pounds per square inch and when operating under normal conditions this pressure is approximately 400 pounds per square inch. Where special conditions make up procedure desirable, the maximum working pressure can be made much higher to conserve space and cost, and we contemplate the use of higher pressures in our invention, and only state the pressure employed in the present illustration of the invention to make clear its fundamental features.

Control of the movement of the hydraulic rotor unit and of the leaf 2 is secured by a single lever 30, Fig. 10, mounted upon the front face of control panel 14. This lever is unlocked by a key, and by swinging it to the right causes the valve to close, to the left to open, and when positioned straight up in the neutral position stops the rotor mechanism. Colored bullseye signal lights 31 above the control lever 30 indicate the movement of the rotor towards the open or closed positions, as the case may be, likewise its position when at rest. A pressure gauge 32 at the top of the control panel 14 shows the oil pressure in the active rotor chambers as they function. An oil level indicator 33, Figs. 1, 2, 10, and 11, in communication with the upper reservoir cavities 25 through the drilled passage 34, shows the oil surface at all times. Two tapped holes 35 for lifting eyes used in assembling the rotor parts, are left as open holes communicating with the cavity 25 above the oil level. These serve as air-breather passageways which are protected against the intrusion of dirt or grit by the dial cover 20. A spring-loaded relief valve (not shown) is built into the control valve 17, likewise a pressure relief switch is inserted within the control panel 14, these two devices being employed to prevent excessive pressures being developed within the oil pressure system. A pressure equalizing switch is also inserted in the control panel. This switch prevents the pump motor 15 from starting and so opening the butterfly valve before the two electrically-controlled needle valves 36, Fig. 1, in the bypass lines 37 have opened and balanced the pressures on both sides of the leaf 2. The entire control system is electrically interlocked for safety and to prevent mal-functioning, but as this mechanism is not a vital part of our present invention we will not illustrate or describe it further.

Figure 9:
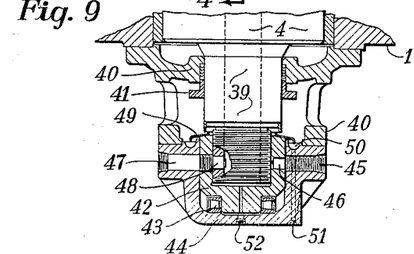
Fig. 9 is an enlarged vertical longitudinal section through the lower portion of the bottom stem and its supporting bearing, taken substantially upon the line 4—4 of Fig. 3.

Inasmuch as the valve leaf 2 of the steel casting type, as illustrated in Fig. 2, weighs 110,000 pounds, and the upper and lower stems together with the remainder of the rotating parts add to this many thousands of pounds more weight, it is evident that to properly lift and centralize the valve leaf 2 with respect to the casing 1 prior to adjusting the metallic seals 38, is no small task, yet we accomplish this easily in the following manner: The lower stem 4, Figs. 1, 3, and 9, is provided with a downward facing extension 39 of reduced diameter, which passes through a stuffing-box 40 with its gland 41 and continuing downwards is provided with a heavy jackscrew threaded length adequate to support the great weight of all the moving parts of the butterfly valve. This lower threaded end portion is co-operatingly received by a similarly threaded collar 42 whose bottom-necked extension is fitted into a crane-hook type anti-friction roller bearing 43, Figs. 2 and 9, which is supported and carried by the thrust bearing casting 44. This casting is centralized with respect to the axis of stem 4 by a finished shoulder on its top face engaging a mating counterbore in the under face of 40, to which it is boltedly secured as shown in Figs. 1 and 9. When vertical adjustment of the leaf 2 is being made in the body 1, a locking pin (not shown) is screwed into the tapped hole 45 in the casting 44, and the end of this locking pin is entered into a mating drilled hole 46 in collar 42, which is thereby restrained from any rotational movement. The hydraulic rotor mechanism is then operated slowly in the proper direction and the threaded stem extension 39 as it turns in the threaded collar 42 acts as a jackscrew and raises the stems 3 and 4 and the leaf 2 until the proper position is reached, whereupon the rotor mechanism is stopped, the locking pin unscrewed from the tapped hole 45 and it is then inserted through the opposite hole 47 in casting 44 and screwed into collar 42, and its inwardly projecting end then enters into the matingly drilled hole 48 in stem extension 39 and consequently locks collar 42 to 39 and preserves the leaf adjustment just obtained as described above. The outer ends of holes 45 and 47 in casting 44 are then tightly plugged to prevent the intrusion of dirt, and the whole weight of the leaf and stems is then supported upon the roller thrust bearing 43, which is immersed in an oil bath contained in the reservoir provided for that purpose in the lower portion of 44. A drip shield 49 is provided above the collar 42 as shown in Fig. 9, which prevents any leakage that might occur past the stuffing-box 40 and gland 41 above, from gaining access to and contaminating the oil bath in casting 44 in which the thrust bearing 43 is submerged. This drip shield 49 discharges any possible leakage coming from above into a circular groove 50 in the upper face of 44 located beneath the downward curving rim of 49, and this drip is collected in groove 50 and carried away by the vertical drain passage 51. A tapped and plugged hole 52 is provided in the bottom face of casting 44 to permit draining the thrust bearing oil reservoir when desired.

Figures 20, 21, 22, 23, 24, 25, 26, 27, 28, 29, 30:
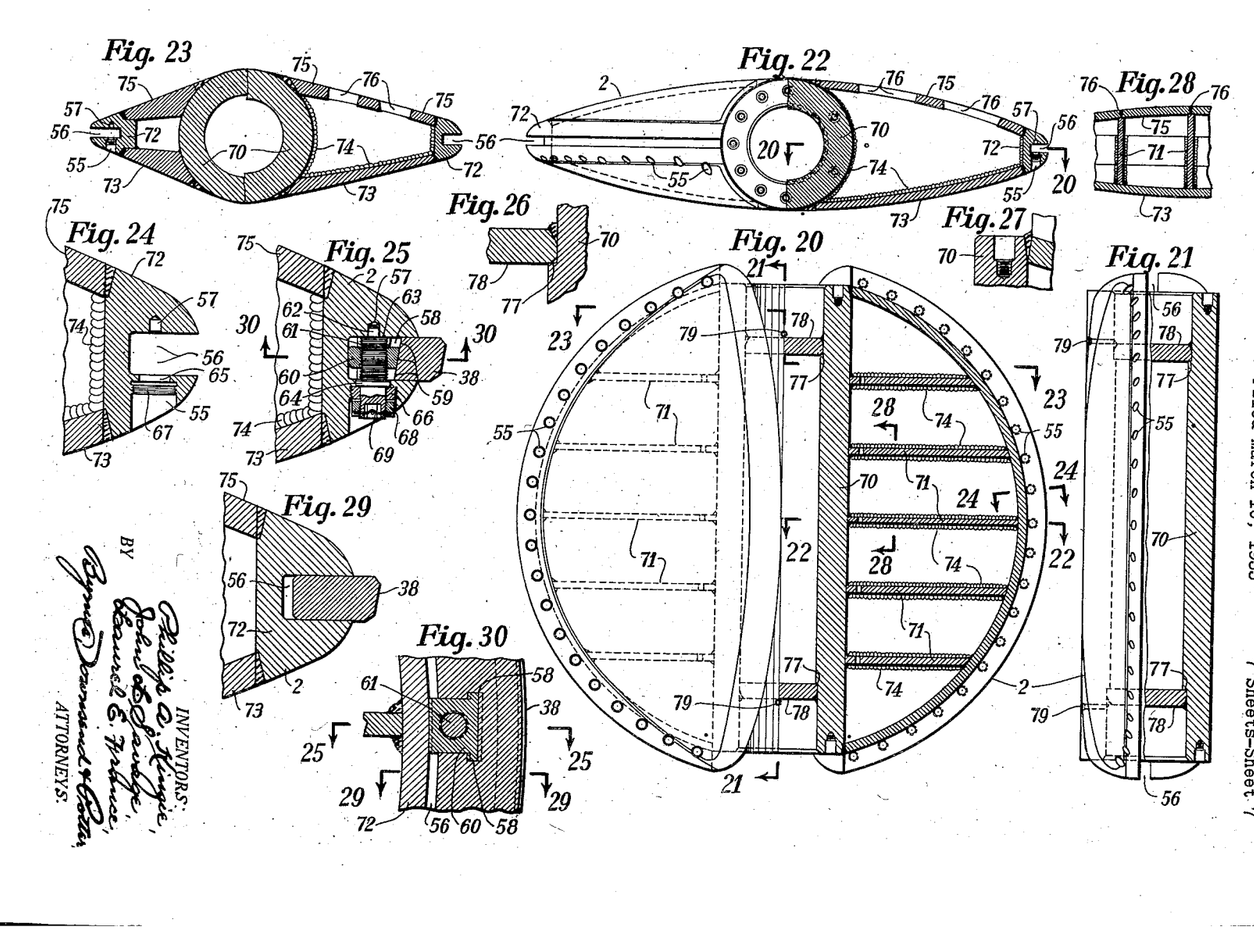
Fig. 20 is a half front elevation and half vertical section, taken substantially upon line 20—20 of Fig. 22, of the welded type butterfly valve leaf.
Fig. 21 is a half edge elevation and half vertical section of the welded leaf taken substantially upon the line 21—21 of Fig. 20.
Fig. 22 is a half plan view of Fig. 20 and a half horizontal section taken substantially upon the line 22—22 of Fig. 20.
Fig. 23 is a horizontal section through the leaf, taken substantially upon the line 23—23 of Fig. 20.
Fig. 24 is an enlarged, horizontal, typical section through the edge of the leaf, taken substantially upon the line 24—24 of Fig. 20.
Fig. 25 is an enlarged assembled section through the edge of the leaf taken substantially on line 25—25 of Fig. 30, showing the metallic seal with its adjusting and locking mechanism in place.
Fig. 26 is an enlarged detail showing the method employed for holding the circular diaphragm plates of Fig. 20 in place.
Fig. 27 is an enlarged fragmentary view showing the welded jointure of the rim to the central vertical tubular member of Fig. 20.
Fig. 28 is a vertical transverse fragmentary section through the leaf, taken substantially upon the line 28—28 of Fig. 20.
Fig. 29 is an enlarged typical section through the edge of the leaf with the metallic seal in place, taken substantially upon the line 29—29 of Fig. 30.
Fig. 30 is an enlarged typical vertical section through the edge of the leaf taken substantially upon the line 30—30 of Fig. 25.

When the leaf 2 has been centralized and adjusted as just described, its metallic seals 38 are then adjusted by means which will now be described. The metallic seals 38 which extend completely around the periphery of the leaf 2, except where the upper stem 3 and the lower stem 4 extend vertically therethrough and their collars 53 divide the seals into two equal semicircular parts, are each disposed symmetrically with respect to the axis of rotation as may be seen in Fig. 1, where the ends of the seals 38 are shown tapped or set into complementarily registering shallow slots cut into the peripheral faces of the collars 53 to receive 38 as may perhaps be best seen in Fig. 3 in the sectionalized view of lower stem 4 where its collar 53 is shown grooved to receive 38. By this construction the seals 38 are made fluidtight where their ends set into the stem collars 53. The seals 38 consist of rectangular non-corrodible metal bars closely fitted into a deeply machined slot around the periphery of the leaf 2 as shown in Fig. 29. This seat groove with 38 removed is also shown in Figs. 21, 22, 23, and 24, while in Figs. 6 and 25 the assembled seat-adjusting mechanism units are shown whereby the outer circumferential surfaces of the seals 38 are forced into fluidtight contact with the mating, cylindrically-bored surface of the non-corrodible metal body, seat 54 Fig. 5, when the leaf 2 is in the closed position as shown in Figs. 3 and 5.

Spaced at equal intervals around the circumference of the leaf 2, Figs. 20 and 21, and adjacent to its periphery are counterbored and tapped holes 55 on the downstream or dry face of the leaf, the details of these holes 55 which are all alike being shown in detail in Fig. 24, where it will be seen that they communicate with the seat groove 56 in the rim of 2, while on the opposite or upstream face of the groove 56, Figs. 24 and 25, it will be seen that a relatively shallow hole 57 of lesser diameter is provided which is aligned with the axis of 55. Around the inward facing circumference of the non-corrodible seal bars 38 rectangular recesses or grooves with oppositely shouldered bottom extension 58, Figs. 25 and 30, are machined to register with the holes 55 in leaf 2, and with their outwardly facing bottom surfaces cut on an incline or taper 59, Figs. 6 and 25, with respect to the axis of the holes 55 and 57, and of the bottom of the seat groove 56 in 2. Within each of these rectangular recesses with their bottom shouldered extensions 58, a non-corrodible wedge block 60, Figs. 2, 6, 25, and 30, is fitted with a flat shoe surface resting on the bottom surface of groove 56 and its opposite side in tapered and wedging engagement with the mating tapered surface 59, Figs. 6 and 25, while its cross-sectional shape resembling a capital T with an enormously thickened vertical stem is clearly shown in Figs. 2 and 30, where the horizontal top of the T-shaped cross section of 60 is shown filling the undercuts 58 of the non-corrodible seal 38. In each of the wedge blocks 60 co-incident with the axial center line of the holes 55 and 57 in 2, a tapped hole is provided to threadably receive the adjusting screws 61, Figs. 2, 6, 25, and 30, which extend through the wedge blocks 60 and are provided with an extension 62, Figs. 6 and 25, of reduced diameter making a close-turning fit in holes 57, and the shoulder 63, so formed on the adjusting screws 61 serves to receive the reactions from the screws when they are rotated in that direction which will pull the wedge blocks 60 towards the opposite ends of the screws 61, and so expand seats 38 outwardly.

Adjusting screws 61 are each provided with a shouldered collar 64, Figs. 6 and 25, which are made a close-turning fit in counterbore 65, Fig. 24, and the outer shoulder face of these collars rests and turns against the opposing face of retaining nut collar 66, Figs. 6 and 25, which are threaded on their outer diameters and screwed tightly to place in the matingly tapped threads 67, Fig. 24, at the bottom of counterbores 55. By the construction just described, and by examination of Figs. 6, 24, and 25, it will be evident that the adjusting screws 61 are effectually restrained from any appreciable axial movement in either direction, and that by virtue of this fact and of the cooperating construction of the T-shaped wedge blocks 60 in the similarly shaped slots 58 in seal bars 38, that rotation of 61 in one direction will force seal bars 38 outwards radially with respect to the center of the leaf 2 when viewed as shown in Figs. 2, 3, and 20, and that opposite or reverse rotation of adjusting screws 61 will obviously retract the seal bars radially inward with respect to the center of 2, and it will also be obvious that if the adjusting screws 61 be locked against rotational movement, that adjustment of the seal bars 38 made with with respect to body seat 54, Figs. 5 and 8, will be maintained. This locking of screws 61 against rotation is secured by the following means. The outer ends of screws 61 are threaded to receive locking collars 68, Figs. 6 and 25, which are made a close-turning threaded fit thereon, and the inner shouldered faces of these collars come into tight engagement with opposing outer end faces of nut collars 66, so that by tightening locking collars 68 the shouldered collars 64 on adjusting screws 61 are drawn tightly against nut collars 66 against the opposite faces of which 68 are likewise tightly engaged as described, thus effectually restraining 61 from movement. The outward-facing ends of both nut collars 66 and locking collars 68 are provided with radial grooves similar to those in conventional castellated nuts of the larger sizes, and these grooves are employed to tighten these parts by means of a special telescoping spanner wrench (not shown) which fits into them. The exposed ends of adjusting screws 61 are provided with countersunk hexagonal recesses which receive the male part of the dual telescoping spanner wrench mentioned above, which thereby readily permits the simultaneous adjustment and tightening of the parts described and of preserving the adjustment of the parts while tightening the locking devices.

Drilled holes are provided adjacent to the outer ends of adjusting screws 61, Fig. 25, through which locking pins 69 are inserted through one of the radial grooves in the outer faces of 68, in much the same manner that a standard cotter pin is used to secure a conventional castellated nut upon an ordinary bolt. The pins 69, after being inserted in parts 61 and 68 as described are then bent midway of their lengths in the broached hexagonal recesses in the end faces of 61 to prevent them from slipping out. This arrangement effectually locks the locking collars 68 in place and so maintains all the co-operating parts rigidly to place. With the arrangement as herein disclosed no bending stresses are imposed on the seal adjusting mechanism, great ruggedness and strength is provided by simple and inexpensive parts and the seal is positively and permanently maintained in position, while the ability to pull the seals into the leaf as well as expanding them outwards is provided.

By means of the construction illustrated in Figs. 20 to 30 inclusive, a simple and economical means and method is provided for building up the valve leaf around a central member formed from a pierced and rolled forging and then applying high-grade steel plate by means of welding and thereby employing material which is not only of greater strength than that which can be secured when structures of this size and weight are fabricated by the casting process, but likewise avoids the hazards of hidden and unseen defects which are always present in steel castings weighing 50 tons or more. The means by which this is accomplished will now be described.

By reference to Fig. 20 it will be seen that the leaf 2 is composed of a central tubular backbone member 70, also shown in Figs. 21, 22, and 23, consisting of a high strength steel forging to which the horizontally extending ribs 71, Figs. 20 and 28, are attached by welding, which together with the two semicircular lip castings 72, Figs. 20, 22, 23, 24, 25, 29, and 30, which are also welded to the outer extremities of the ribs 71, thereby forms the skeleton or framework over which the downstream skin plates 73 is fitted and then welded to the ribs 71 and to the central tubular backbone member 70, as shown in Figs. 20, 22, 23, 24, 25, and 28, it being understood that in all these figures welds shown in section are indicated in black, while those in elevation are indicated by the conventional beaded lines 74 shown in the figures.

The downstream skin plates 73 are applied to the framework first and welded thereto on the inside as just described because of the fact that when the completed leaf 2 is put into service and the water load is applied to it in the closed position, the downstream side is then subjected to tensile stresses due to bending, and by welding it to the framework from the inside its full tensile value can be secured and made effective by means of the double welding which can be so readily effected by this procedure, as will be evident by inspection of the drawings. The leaf structure is now ready to receive the upstream skin plate 75, which upon being applied immediately presents the problem as to how to adequately secure it to the supporting framework by welding which must now be done from the outside. This problem is one which has until now prevented successful fabrication of butterfly leaves of the character described, and yet the solution afforded by this invention is exceedingly simple once it is seen and understood, and this solution is as follows: Before the halves of the upstream skin plate are placed upon the nearly completed leaf structure, welding slots 76, Figs. 22, 23, and 28, are flame cut through the plates in correct positions to come immediately over and register with the upper edge surfaces of the ribs 71 when plates 75 are placed in their final positions. These slots 76 are then used to weld the plates 75 to the ribs 71 and the slots are then filled flush with welding metal. Inasmuch as the plates 75 are on the upstream or pressure side of the leaf when in service, they are in consequence subjected to compression loading, which permits the welding process just described to develop their full strength in compression, and make them act as one with the other component parts of the leaf structure.

The pierced and rolled forging 70 is roughbored so that its interior surfaces may be thoroughly scrutinized to insure good metal therein, and the counterbore for the stem stubs 3 and 4 are made enough bigger as to form shoulders 77, Figs. 20, 21, and 26, and into these counterbores and against the shoulders 77 heavy plate-steel disks 78 are forced and then welded oiltight around their peripheries to tubular member 70, through whose walls a grease pump hole 79, Figs. 20 and 21, is drilled and its outer end plugged. Upon removal of the plugs from either or both of these holes and screwing in the nozzle of the delivery line from the high-pressure grease pump 19, Fig. 2, grease under high pressure can be introduced into the cavities between the stem stubs 3 or 4, Figs. 3 and 4, and is so employed therein as to cause the cooperating parts to act as a hydraulic ram to force either or both of these members out of the leaf whenever such procedure is desired.

That the welded leaf structure just described possesses many marked advantages both from an economic and also from an operating and fabricating viewpoint as well is evidenced by the fact that the cast-steel leaf 2 illustrated in Figs. 2, 3, 4, and 7, weighs over 110,000 pounds while the welded leaf 2 shown in Figs. 22 to 30 inclusive weighs 74,000 pounds, is stronger and is composed of material from which the hazard of serious concealed defects has been removed.

Reference was made in the fore part of this description to the bending of the leaf when under its heavy water load and of the accompanying deflection of the stem 3, Figs. 2 and 11, where it extends above its bearing and into the hydraulic rotor mechanism above, and of the necessity of permitting the stem to deflect, deviate and weave from the theoretically correct vertical axis of rotation which it would assume were there no water load upon it.

The complete rotor and braking mechanism shown in Figs. 2 and 11 is retained centralized with the actual axis of the stem extension 3, while allowing practically complete freedom to deflection, weaving and deviating movements of the stem under varying loading conditions set up by rotational movements of the leaf, by providing a bearing 80 in cover casting 13 which closely fits the upper end of the stem extension 3, which, in consequence of the flexible mounting of the rotor base flange 10 below, as will be described later, causes the entire rotor mechanism assembly to gyrate and move in unison with the stem 3 as it weaves and moves, responsive to varying loadings upon the leaf below.

The problem of providing a flexible connection between the rotor base 10 and the top flange of the valve casing 1, and at the same time to provide means for transferring the enormous torque or turning effort reaction produced by the rotor from 10 into 1 was very discouraging, yet the solution when finally worked out was a relatively simple one and is accomplished as follows: In the upper flanged face of body casing 1, Figs. 3 and 5, a deep rectangular groove 81, circularly disposed around and concentric with stem 3 when viewed in plan, Fig. 5, is provided, and crossing this groove or recess in alignment with the center line of the valve body and coincident with the line of fluid flow therethrough, two very large rectangular keys 82, Fig. 5, are placed on opposite sides of the stem 3. These keys span the groove 81 and their ends are embedded into the matingly machined grooves through the metal on either side of 81 placed there to receive and support them. One of these keys 82 with its retaining screw 83 is shown in sectional elevation in Fig. 4, also in Figs. 2 and 11. Heavy pieces of treadstock rubber 84, Figs. 2 and 11, rectangular in cross section and semicircular in plan, are inserted into the groove 81, with their ends resting against the opposite side faces of the keys 82, forming an almost complete ring around the stem 3. The cross-sectional dimensions of this incomplete rubber ring 84 are made such that a nominal clearance is provided between its inner diameter and the adjacent vertical wall face of groove 81, so that the rubber may compress as the rotor base flange 10 is depressed at any point about its circumference responsive to deflective movement of stem 3.

A complete rubber ring 85 is placed upon the upper face of base flange 10, with a similar clearance between its inner diameter and the adjacent turned vertical cylindrical surface of the rotor base, and a split ring metal guard 86, Figs. 2, 10 and 11, rests upon the top surface and covers and protects the rubber ring 85. Tapped holes 87, Fig. 5, are spaced equally around the middle circumference of ring groove 81, into which shouldered studs 88, Figs. 1, 2, 10, and 11, are screwed, with their vertical height between the bottom of groove 81 and the upper face of guard ring 86 passing through holes provided in parts 84, 10, 85 and 86, and made of such length that when the nuts upon their upper ends are drawn down tight against their upper shoulders, the nuts draw against the upper face of guard ring 86 and moderately compress the upper cushion ring 85 and lower cushion ring 84. By this arrangement the base flange 10 is floatingly mounted between the upper rubber ring 85 and the lower rubber ring 84, so that it may respond within all reasonable limits to the motions introduced into the rotor mechanism assembly through the top bearing 80 from stem 3 as previously described; while at the same time the rotor base 10 is effectually restrained from rotation through the agency of the keys 82 which are likewise set into the rotor base 10 with a vertical clearance provided between the upper faces of the keys 82 and the adjacent surfaces of the keyways above in base 10 as shown in Figs. 10 and 11, and thus the requisite freedom of movement is given to stem 3 while still maintaining all the rotor mechanism correctly positioned with respect to stem's actual or real axis at all times.

Since there is practically no bending stress imposed in the stem 3 where it extends above its bearing in the valve body 1, it is reduced in diameter as shown in Figs. 2, 3, 4, and 11, and extends upwards through the lower stuffing-box 89 and gland 90 which prevent water from escaping around it from the valve below, and continuing upwards passes through a similar gland 91, Figs. 2 and 11, and through a similar stuffing-box formed in base casting 10, which prevents oil in the rotor assembly from escaping downwards around the stem. Stem 3 continues upwards through practically the entire height of the rotor mechanism as may be seen in Figs. 2 and 11, and throughout the major portion of its upper length it is provided with vertically disposed milled splines 92 spaced equally about its circumference as shown in Fig. 12. The rotor element 23, Fig. 12, is matingly splined to fit closely to the stem 3, and thereby imparts any rotative force impressed upon it by pressure fluid acting within the rotor chambers A and A' or B and B' directly into the stem 3, which by reason of the splined construction is uniformly loaded around its circumference and can, while so loaded, move slightly in axial direction either way with respect to the rotor 23 or the remainder of the operating mechanism above, as the accompanying deflectional movements of the stem may dictate. The rotor 23, Fig. 12, is symmetrical in plan and its opposite vertical end faces are turned to loosely fit the bore of cylinder 11 and are each provided with a vertical rectangular seat recess into which the metal seal bars 93, Figs. 12, 15, and 18, are closely adjusted for a radially reciprocating sliding fit, and are forced outward into intimate contact with the adjacent cylindrical bore of 11 by the coiled springs 94, Fig. 18, which are contained within drilled holes in the bottom of the seat recesses for 93, and press outwardly upon the seal bars 93, which are restrained from being forced too far out of these recesses during assembly by the shouldered screws 95, whose flat fillister heads are sunk into mating counterbores in the seal bars 93. The rubbing face of these seal bars 93 are grooved lengthwise as shown at 96 in Fig. 15, as are also the rotor ring seals 100 and any pressure oil that succeeds in passing between the rubbing surfaces of the seals and the adjacent cylinder wall is collected in 96 and returned to the oil reservoir so that the fluid pressure within these grooves is maintained at a very low value at all times. Leather gaskets 97 are carefully fitted to the backs of all the rotor seal bars and are so cut that when they are inserted into the seal slots or recesses, their widths are slightly greater than that of the recesses and they in consequence closely hug the sides of the seal slots and the more pressure that is applied between their inner faces and the bottoms of the seal slots, the tighter they are against leakage past them, and so by applying the rotor chamber pressure behind these seal bars in the space between the leather gaskets 97 and the bottom of the seal recesses, the rotor seal bars 93 are forced outward into tight engagement against the cylindrical bore of cylinder 11, and effectually prevent the pressure fluid from escaping thereby, and this same principle is employed with the top and bottom rotor seals 98, Figs. 11 and 18, the stator seals 99, Figs. 11, 12, 14, and 16, and the upper and lower rotor ring seals 100, Figs. 11 and 18, which are likewise each provided with pressure relieved grooves on their contacting working faces, with leather gaskets on their back or interior faces, and with fluid under high pressure applied behind their leather gaskets to force them out into fluid-tight contact with the cooperating working faces against which they act. The double-acting ball check valves 101, Figs. 11, 12, 15, and 18, are employed to admit pressure from whichever side of the rotor 23 the fluid pressure is present to the space behind the seals 93 and 98 in the rotors, while the single-acting ball check valves 102, Figs. 12 and 16, serve the same purpose for the stator seals 99, which likewise feed the spaces behind the upper and lower ring seals 100 through the inclined drilled holes 103, Figs. 11 and 14. As previously stated, all the grooves 96 in the seals 93, 98, 99, and 100 are drained into the storage reservoir cavities 25 and 26 so that no appreciable fluid pressure is ever allowed to build up between the working surfaces of the seals and the cooperating contact surfaces against which they rest, and this is accomplished in the case of the upper and lower rotor ring seals 100, Figs. 11 and 18, by the drilled holes 104 and 105, Figs. 11 and 18, which likewise serve the grooves 96 in rotor end seals 93 and top and bottom rotor seals 98, the interconnecting groove to hole 104 being shown in Fig. 18. Since the stator seals 99, Figs. 11 and 14, and the upper and lower rotor ring seals 100 are both stationary, intercommunicating slots are cut in the seals 100 to register with the drainage grooves 96 in each of the stator seals 100, as is shown in Fig. 14, and by this means the drainage grooves in seals 99 feed into those of 100 which are drained into holes 104 and 105 as already described. The various seal bars and rings enumerated in the foregoing description are made from a high-grade bronze and while they are sturdy in section they are also sufficiently flexible as to be able to conform readily with any minute inaccuracies in the machined surfaces in contact with them, and in consequence they are highly efficient in preventing the passage of pressure fluid past them, and at the same time, due to the practically perfect high-pressure flood lubrication provided to them by the pressure fluid itself, they are practically immune to wear.

The manifold stator 106, Figs. 2, 11, 12, 13, and 14, and the reservoir stator 107, Fig. 2, and 12 are both subjected to exceptionally severe side thrust loadings tending to push them around the bore of the cylinder 11 in a clockwise direction when the valve is being opened under full working pressure, and in the reverse or anticlockwise direction when the valve is being closed with maximum working pressure prevalent in the pressure chambers A and A' of Fig. 12, and to resist this thrust a heavy rectangular key 108, Figs. 13 and 14, is placed in the upper and lower ends of each of these stators. These keys are positioned radially in plan with reference to the center line of the rotor mechanism, and the bottom key in each of the stators keys its respective rotor to the upper face of base casting 10, while the upper keys perform a like office for their respective stators in the under face of brake cylinder 12. In addition to this, each of the stators are heavily bolted to the walls of the cylinder 11 by two vertical rows of tap bolts 109, Figs. 1, 10, and 12, which firmly clamp the machined outer diameters of the stators against the bored interior surface of the cylinder 11.

Horizontally disposed cylindrical shear pins 110, Figs. 1, 2, 10, 11, and 18, radially spaced around the circumference of the rotor mechanism in the joints between 13 and 12, 12 and 11, and 11 and 10, to transmit downwards into the rotor base 10 the turning torque reactions generated in the rotor mechanism above.

All pressure fluid entering the rotor chambers A—A', Fig. 12, for producing clockwise closing movement of the rotor 23 and the leaf 2 in the valve casing below comes from the control valve 17 through the horizontal passage 111, Figs. 11, 12, and 13, and into the vertical passage 112 through which it flows upwards and into the cored passage 22 in casting 13 above, from which it is delivered by a downward facing port 113, Fig. 13, into chamber A and in similar manner into A'. Conversely, all pressure fluid entering the rotor chambers B—B' to produce anticlockwise rotation of the rotor comes from control valve 17 through the horizontal passage 114, Figs. 12 and 13, into vertical opening passage 115, through which it flows downwards and into the cored passage 24 in base casting 10, from which it is delivered by an upwardly facing port 116, Fig. 13, into chamber B' and in similar manner into chamber B as well, and these ports 116 may be seen in plan in Fig. 12.

Stop plates 117, Figs. 12 and 13, are symmetrically attached to rotors 106 and 107 by screws 118, Fig. 13, with adjusting shims between the plates 117 and their respective rotors so that when the matingly machined stop surfaces 119, Fig. 12, on the rotor 23 come into stopping contacting engagement with the stop plates 117, these may be adjusted so that the leaf in the valve casing 1 below will be brought into the precise positions desired when fully closed and when fully opened, and will then always be returned to these same identical positions whenever the valve is operated.

To hold the valve leaf 2 in any position to which it may be set, whether that position be at either extreme of its travel, or at any intermediate point between those extreme positions, an automatic, hydraulically released dual braking device is incorporated in the rotor mechanism immediately above the rotor chambers. This braking mechanism is enclosed between the under face of cover 13, Figs. 2 and 11, and upper interior face of brake cylinder 12, where, within the space between the parts mentioned, two symmetrically facing disk members 120 are placed with powerful coiled springs 121 acting vertically between them and forcing their peripherical conical surfaces into clutching engagement with the mating interior clutch surfaces of parts 12 and 13, while their hubs are in slidingly splined engagement with upper stem extension 3. By this arrangement a very powerful braking mechanism is supplied to hold the leaf in any position desired. This mechanism is released automatically by pressure fluid flowing upwards through the pipe 122, Figs. 2 and 11, to and through the horizontal drilled passage 123 and into the space between the under side of the lower brake disk 120 and the adjacent surface of the brake cylinder 12. This space is made fluid-tight by reason of the peripheral surface of the clutch disk being held in tight engagement with the mating clutch surface of 12 by the springs 121, and by the piston rings 124, Figs. 2 and 11, in the hubs of brake disks 120, which close off leakage between the outer diameters of the hubs and the mating bores in parts 12 and 13, consequently the pressure fluid entering this space through the passage 123 acts therein over the bottom surface of 120 as a piston in a cylinder and forces it upwards and compresses the springs 121, and when this occurs the pressure fluid rushes upwards around the outer circumference of 120, and enters the passage 125, Figs. 11 and 17, leading to the space above the upper side of top brake disk 120, where pressure up till now has been denied through the agency of the built-in ball check valve 126, Figs. 11 and 17, which is so arranged as to allow fluid displaced by the action of the springs 121 in setting the clutches 120 to escape outwardly through the pipe 122 when there is no pressure present in that member, but prevents any pressure inflow from 122 past 126 into this upper brake cylinder or chamber. Pressure fluid is prevented from entering the space between the upper and the lower brake disks 120 by the ring 127, Figs. 2 and 11. When fluid pressure has been established as described above, the upper brake disk 120 as well as below the lower disk, which was in consequence released first, the weight of the disks 120 plus the rotational urge of the rotor induced by this fluid pressure then releases the upper brake disk and rotational movement of the valve mechanism is then free to take place. As soon as the fluid pressure drops to zero after the pressure pump 16 has stopped, the reverse procedure then occurs. Pressure is no longer present in the upper and lower brake cylinders to compress the springs 121 and so keep the brake disks 120 free of engagement, consequently the springs 121 become effective at once by forcing both brake disks into active engagement and so lock the valve disk in any position to which it may have been set.

Having now set out the objects and description of our invention, we wish to call attention to the fact that the shape and relationship of the various parts may be altered and shifted without departing from the spirit of our invention or the scope of the following claims.

We claim:

1. A butterfly type valve with a hydraulically-operated rotor mechanism coincident with the axial center line of rotation for securing opening or closing movement of the valve element, with a cooperating braking element automatically released through the agency of the pressure fluid employed to operate the hydraulic rotor, and engaged to maintain the valve element in any predetermined position as soon as pressure is released from the rotor element.

2. In a device of the type stated, the combination with a casing having an element rotatably supported therein by a stem which extends to the exterior of the casing, said element being subjected to stresses which vary with the angular adjustment thereof and which may be of such magnitude that the resulting strain in said casing and stem deflects the axis of said stem by amounts which vary with the angular adjustment of said stem and element of operating means supported by and upon the extending portion of said stem for effecting angular adjustment thereof, said means including a housing, a rotor element within said housing and secured to said stem, and means connecting said housing and casing to secure the same against relative angular movement about the axis of said stem while permitting rocking movement of said housing upon said casing.

3. The invention as set forth in claim 2, wherein said operating means comprises a fluid-pressure motor, in which said housing is cylindrical and is provided with diametrically opposed stator elements secured to its inner wall, and said rotor comprises a hub secured to said stem and having opposed radial blades cooperating with said abutments to form two pairs of pressure chambers, whereby the turning stress applied by said operating means to said stem is a pure torque free from bending moments.

4. The invention as set forth in claim 2, in combination with brake means for opposing angular movement of said stem by applying thereto a torque free from bending moments.

5. The invention as set forth in claim 2, in combination with brake means for locking said stem in any desired position of angular adjustment thereof, and means for simultaneously controlling said brake means and said operating means.

6. A valve of the type including a casing, a valve element therein and secured to a stem which extends to the exterior of the casing, operating means exterior to said casing for effecting angular adjustment of said stem, and brake means for locking said stem in any desired position of angular adjustment thereof, said valve being adapted to be subjected to fluid pressures of a magnitude which produce deflection of the axis of said stem, characterized by the fact that a fluid-tight journal for said stem is mounted on said casing, and said operating means comprises a hydraulic rotor secured to and supported by the extending portion of said stem, the axis of the rotor element of said rotor coinciding with the axis of the extending portion of said stem, and the housing of said rotor is secured against angular movement with respect to said casing but is free to rock thereon to conform to the deflection of said stem.

7. In a valve, the combination with a casing, a valve element pivotally mounted therein, an operating stem secured to said element and extending to the exterior of said casing, of operating means for applying to said stem a substantially pure torque, said operating means comprising a housing having journals in which the extended portion of said stem is rotatably mounted, means securing said housing against angular displacement with respect to said casing while permitting relative movement of the casing and housing to compensate for stem deflection, a rotor element secured to said extended stem portion, abutments within said housing and cooperating with said rotor element to form a fluid-pressure motor having a plurality of pressure chambers, and means for supplying pressure fluid to and from the respective chambers to rotate said stem in the desired direction.

8. A valve as claimed in claim 7, in combination with stop means including shims for determining at least one of the extremes of the possible angular adjustment of said stem and the valve member actuated thereby.

9. A valve as claimed in claim 7, wherein said rotor element and abutments include co-operating stop surfaces for determining the two extremes of the angular adjustment of said stem and the valve leaf actuated thereby.

10. In a valve, the combination with a casing, a valve member pivotally mounted therein, and an actuating stem extending to the exterior of said casing, of a housing surrounding said stem and locked against angular movement with respect to said casing, a rotor element and a brake element within said housing and secured to said stem, and fluid pressure means for actuating each of said elements.

11. A valve as claimed in claim 10, wherein said rotor element comprises a hub splined to said stem and having radial fins, and the portion of the housing in which said rotor element is located is cylindrical and has abutments cooperating with said rotor element to define a plurality of sets of sector-shaped chambers for receiving a pressure fluid.

12. A valve as claimed in claim 10, wherein said rotor element comprises a hub splined to said stem and having radial fins, and the portion of the housing in which said rotor element is located is cylindrical and has abutments cooperating with said rotor element to define a plurality of sets of sector-shaped chambers for receiving a pressure fluid; and said fluid pressure means includes a reservoir within said housing, a pump and operating motor mounted on said housing, a control valve and passages for selectively connecting certain of said chambers to said pump outlet and the remaining chambers to said reservoir.

13. A valve as claimed in claim 10, wherein said rotor element is positioned adjacent said casing and said brake element is positioned adjacent the outer end of said stem.

14. A valve as claimed in claim 10, wherein said brake element comprises an annular piston splined to and slidable along said stem, and said housing provides a cylinder having a conical brake surface cooperating with a similar conical surface at the periphery of said piston, and spring means normally holding said conical surfaces in engagement, whereby the supply of pressure fluid to said cylinder moves said piston to break the engagement of said conical surfaces.

15. In a valve, the combination with a casing, a valve member pivoted therein, and a hydraulic rotor for adjusting said valve member, of a hydraulic brake for locking said valve member in a desired position of adjustment, said brake including a housing having oppositely tapered conical surfaces which flare inwardly from their junction, a pair of pistons each having a conical surface for mating engagement with the respective conical surfaces of said housing, spring means for forcing said pistons apart, means slidably connecting each piston to and securing the same against angular movement with respect to an element movable with said valve member, and means for applying pressure fluid to the outer faces of said pistons to move the same towards each other, thereby to release said pistons from engagement with the conical surfaces of said housing.

16. In a valve, the combination with a casing, a valve member pivoted therein, and an operating stem secured to said member and having a portion extending outside said casing, of a housing surrounding said extended portion of said stem, means securing said housing against angular movement with respect to said casing, operating means in said housing for actuating said stem, brake means in said housing for locking said stem against angular movement, said housing including a plurality of cylindrical elements, means rigidly connecting the said cylindrical elements to each other, and a plurality of shear pins at the junction of adjacent cylindrical elements.

17. In a valve, the combination with a casing, of a valve element pivotally mounted therein, an operating stem secured to said element and extending exteriorly of said casing, and operating means applied to said stem and a part of which is restrained against rotational movement with respect to said stem while the said casing and operating means are associated to permit relative movement to compensate for stem deflection.

18. In a valve, the combination with a casing, of a valve element pivotally mounted and having a stem, a stem operating motor provided with a stator and a rotor, the latter in direct alignment with the axis of said stem, and means preventing angular displacement of the stator around the axis of the stem and rotor while providing for movement of the motor as a whole upon deflection of the stem, whereby said motor is substantially free to exert full torque upon the operating stem irrespective of stem deflection.

19. In a valve, the combination with a casing, of a valve element within said casing and having a stem, an operating motor provided with a rotor and stator, at least one of which is attached to the stem and the other secured to the casing against angular displacement around the stem while providing for other angular adjusting movement compensating for stem deflection without mal-adjustment between rotor and stator.

PHILLIP A. KINZIE.
JOHN L. SAVAGE.
LAUREL E. FRANCE.